(12) United States Patent
Kim

(10) Patent No.: US 9,364,865 B2
(45) Date of Patent: Jun. 14, 2016

(54) SYSTEM AND METHOD FOR SORTING PARCEL

(71) Applicant: Electronics and Telecommunications Research Institute, Daejeon (KR)

(72) Inventor: Ki Hak Kim, Cheongju-si (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 0 days.

(21) Appl. No.: 14/337,763

(22) Filed: Jul. 22, 2014

(65) Prior Publication Data

US 2015/0217334 A1    Aug. 6, 2015

(30) Foreign Application Priority Data

Feb. 5, 2014    (KR) .................... 10-2014-0013119

(51) Int. Cl.
*B07C 3/08*    (2006.01)
*B07C 3/02*    (2006.01)
*B65G 47/34*    (2006.01)

(52) U.S. Cl.
CPC ... *B07C 3/02* (2013.01); *B07C 3/08* (2013.01); *B65G 47/34* (2013.01)

(58) Field of Classification Search
CPC ............ B07C 3/02; B07C 3/08; B07C 3/082; B65G 47/34; B65G 47/42; B65G 47/44; B65G 47/844; B65G 2207/18; B65G 2207/36; B65G 17/48
See application file for complete search history.

(56) References Cited

U.S. PATENT DOCUMENTS

| | | | | |
|---|---|---|---|---|
| 3,223,225 A | * | 12/1965 | Clark ................... | B65G 47/681 198/357 |
| 3,550,748 A | * | 12/1970 | Hauer .................. | B65G 17/345 198/370.06 |
| 4,249,661 A | * | 2/1981 | Lem ....................... | B65G 47/54 198/367 |
| 4,915,209 A | * | 4/1990 | Canziani ................ | B65G 43/08 198/357 |
| 5,065,237 A | * | 11/1991 | Tsikos ...................... | B07C 1/02 209/586 |
| 5,547,084 A | * | 8/1996 | Okada .................. | B65G 17/345 198/370.06 |
| 5,588,520 A | * | 12/1996 | Affaticati ................ | B61B 13/08 198/370.06 |
| 6,005,211 A | * | 12/1999 | Huang ..................... | B07C 3/02 198/370.06 |
| 6,102,291 A | * | 8/2000 | Mazzone ................ | G01B 11/00 235/462.01 |
| 6,137,577 A | * | 10/2000 | Woodworth ........... | G01B 11/04 356/623 |

(Continued)

FOREIGN PATENT DOCUMENTS

| | | | |
|---|---|---|---|
| KR | 1020020043613 A | | 6/2002 |
| KR | 1020070061133 A | | 6/2007 |

*Primary Examiner* — Joseph C Rodriguez
(74) *Attorney, Agent, or Firm* — William Park & Associates Ltd.

(57) ABSTRACT

A system and method for sorting a parcel moves an article to a cart according to destination information of the article to classify the article to a chute for each destination. An article position detecting unit detects positional information of the article loaded on the cart that moves in a first direction by a track which moves in the first direction. A control unit controls the cart to rotate in a second or third direction according to the detected positional information of the article and destination information of the article.

7 Claims, 7 Drawing Sheets

(56) References Cited

U.S. PATENT DOCUMENTS

| | | | | |
|---|---|---|---|---|
| 6,478,138 B1* | 11/2002 | Edwards | ............. | B65G 17/345 198/370.06 |
| 6,484,066 B1* | 11/2002 | Riess | ................... | G01B 11/00 198/502.2 |
| 6,641,042 B1* | 11/2003 | Pierenkemper | ...... | G06K 7/0008 235/461 |
| 6,889,814 B2* | 5/2005 | Cerutti | ..................... | B07C 3/02 198/358 |
| 7,084,989 B2* | 8/2006 | Johannesson | ........ | G01B 11/046 356/601 |
| 7,562,760 B2* | 7/2009 | Affaticati | ................. | B07C 5/36 198/357 |
| 7,870,945 B2* | 1/2011 | Mileaf | ..................... | B07C 3/08 198/431 |
| 7,909,155 B2* | 3/2011 | Lupton | .................. | B65G 43/08 198/357 |
| 9,122,677 B2* | 9/2015 | Bonner | ................... | G06F 17/30 |
| 9,150,362 B2* | 10/2015 | Vegh | ..................... | B65G 43/08 |
| 2003/0221935 A1* | 12/2003 | Barklin | ................ | B65G 17/345 198/357 |
| 2008/0157973 A1 | 7/2008 | Park et al. | | |
| 2014/0277700 A1* | 9/2014 | Maglaty | ................ | B65G 43/10 700/230 |
| 2014/0305850 A1* | 10/2014 | Serjeantson | .............. | B07C 3/08 209/546 |

* cited by examiner

SYSTEM AND METHOD FOR SORTING PARCEL

CROSS-REFERENCE TO RELATED APPLICATIONS

This application claims priority to and the benefit of Korean Patent Application No. 10-2014-0013119 filed in the Korean Intellectual Property Office on Feb. 5, 2014, the entire contents of which are incorporated herein by reference.

TECHNICAL FIELD

The present invention relates to a system and a method for sorting a parcel, and more particularly, to a system for sorting a parcel that arranges articles at an outlet edge for each corresponding destination.

BACKGROUND ART

With the growth of a delivery service industry, parcels are increased yearly. As a result, a post office or a distribution center uses a parcel sorting system in order to efficiently classify mail. In recent years, new sorting devices including a cross belt type, an E-Tray type, and the like have been developed and commercialized in order to increase an article processing capacity, and developed to sort small-sized articles and large-sized articles. However, since a parcel sorter has a high speed and article sizes vary, it is not easy to accurately locate the articles at the center of a cart when the articles are put in the cart. In addition, a fast track speed and an article position on the cart are not constant, thereby leading to an increase in a missorting occurrence probability in which an article of a different sorting hole is discharged.

As illustrated in FIG. 1, in a parcel sorting system in the related art, while a cart 30 is moved by a track 20, parcels 10a to 10c loaded on the cart 30 are classified to chutes 40 that match respective destinations, and positions that the article are dropped to the chutes become different depending on positions of the articles on the cart 30.

That is, in FIG. 1, the parcel 10a is dropped at a front side of the chute, the parcel 10b is dropped at a middle side of the chute, and the parcel 10c is dropped at a rear side of the chute, and the classification to the chutes may not be smoothly performed depending on the position of the parcel on the cart 30.

In order to solve the problem, a method of designing an inlet of the chute to have a size of 2 m or more is applied, but the size of the chute inlet is designed to be larger than necessary, and as a result, spatial efficiency may deteriorate.

As described above, since it is difficult to accurately sort the parcel on the cart to the corresponding destination chute in the related art, a system for solving the problem is required.

SUMMARY OF THE INVENTION

The present invention has been made in an effort to provide a system and a method for sorting a parcel that can accurately sort parcels by arranging the parcels on edges close to chutes for respective destinations on a cart.

An exemplary embodiment of the present invention provides a system for sorting a parcel, which moves an article to a cart according to destination information of the article to classify the article to a chute for each destination, the system including: an article position detecting unit which detects positional information of the article loaded on the cart that moves in a first direction by a track which moves in the first direction; and a control unit which controls the cart to rotate in a second or third direction according to the detected positional information of the article and destination information of the article.

The control unit may rotate the cart in the second direction so that the article is positioned at an edge of the cart in the second direction in the case where the article is positioned at the center of the cart or at an edge in the third direction, when the article needs to be classified to a first chute provided in the second direction of the cart according to the destination information of the article.

The control unit may rotate the cart in the third direction so that the article is positioned at the edge of the cart in the third direction of the cart in the case where the article is positioned at the center of the cart or at the edge in the second direction, when the article needs to be classified to a second chute provided in the third direction of the cart according to the destination information of the article.

The first direction may be vertical to the second direction or the third direction, and the second direction and the third direction may be completely opposite to each other.

The article position detecting unit may include: a first sensor which linearly senses the article in the second or third direction of the cart; a second sensor which senses the article in a first diagonal direction of the cart; and a third sensor which is positioned to be opposite to the second sensor and senses the article in a second diagonal direction of the cart.

The second sensor may be provided at the end of the track in the second direction of the cart, the third sensor may be provided at the end of the track in the third direction of the cart, and the first sensor may be provided at a position spaced apart from the third sensor by a predetermined distance.

The control unit may calculate the position of the article by using a first sensing time which is a time interval between a time when the article is sensed by the second sensor and a time when the article is sensed by the first sensor, a speed of the track, a maximum value of the sensing times, and a long-axis length value of the cart, when the article needs to be classified to the first chute provided in the second direction of the cart according to the destination information of the article.

The control unit may calculate the position of the article by using a second sensing time which is a time interval between a time when the article is sensed by the third sensor and the time when the article is sensed by the first sensor, the speed of the track, and a maximum value of the sensing times, and a length value of the cart, when the article needs to be classified to the second chute provided in the third direction of the cart according to the destination information of the article.

The article position detecting unit may be a camera that photographs the cart and the article loaded on the cart.

The control unit may calculate a position between the cart and the article from information on the image photographed by the camera by using an edge detection technique.

The system may further include a transmitting unit which transmits a control signal for controlling rotation of the cart to the cart under the control by the control unit. Further, the system may further include a storing unit which stores the destination information of the article, the speed information of the track, and the positional information of the article.

Another exemplary embodiment of the present invention provides a method for sorting a parcel, which loads an article on a cart according to destination information of the article to classify the article to a chute for each destination, including: calculating the position of the article loaded on the cart which moves in a first direction by a track; and moving the article on the cart to a second direction or a third direction that is an edge position which gets close to the chute for each destination on the cart, by moving a cross belt of the cart according to positional information of the article and destination information of the article.

The calculating of the position of the article may include receiving image information for the article loaded on the cart; and calculating an interval between an edge of the cart and both sides of the article from the image information by using an edge extraction algorithm.

The calculating of the position of the article may include sensing the article by using a first sensor that senses the article in a straight-line direction to a long-axis direction of the cart, a second sensor that is provided at the end of the third direction of the cart and senses the article in a diagonal direction of the cart, and a third sensor that is provided at the end of the second direction of the cart and senses the article in the diagonal direction of the cart; and sensing the position of the article by using a sensing time which is an interval between a time when the article is sensed by the diagonal sensor and a time when the article is sensed by the straight-line sensor.

In the sensing of the position of the article, when the article needs to be classified to a first chute provided in the second direction of the cart according to the destination information of the article, it may be judged that the article is positioned at a position distant from the first chute on the cart in the case where the sensing time by the second sensor and the first sensor is long.

In the sensing of the position of the article, when the article needs to be classified to a second chute provided in the third direction of the cart according to the destination information of the article, it may be judged that the article is positioned at a position distant from the second chute on the cart in the case where the sensing time by the third sensor and the first sensor is long.

In the moving of the article on the cart to the second direction or the third direction that is the edge position which gets close to the chute for each destination, when the article needs to be classified to the first chute provided in the second direction of the cart according to the destination information of the article, in the case where the article is positioned at the center of the cart or at an edge in the third direction, the cross belt of the cart is moved in the second direction so that the article is positioned at the edge of the cart in the second direction.

In the moving of the article on the cart to the second direction or the third direction that is the edge position which gets close to the chute for each destination, when the article needs to be classified to the second chute provided in the third direction of the cart according to the destination information of the article, in the case where the article is positioned at the center of the cart or at the edge in the second direction, the cross belt of the cart may be moved in the third direction so that the article is positioned at the edge of the cart in the third direction.

The first direction may be vertical to the second or third direction.

According to exemplary embodiments of the present invention, parcels are efficiently sorted in a parcel sorter to smoothly sort the parcels and missorting to a destination chute is decreased to improve performance of the parcel sorter.

Figure 1:
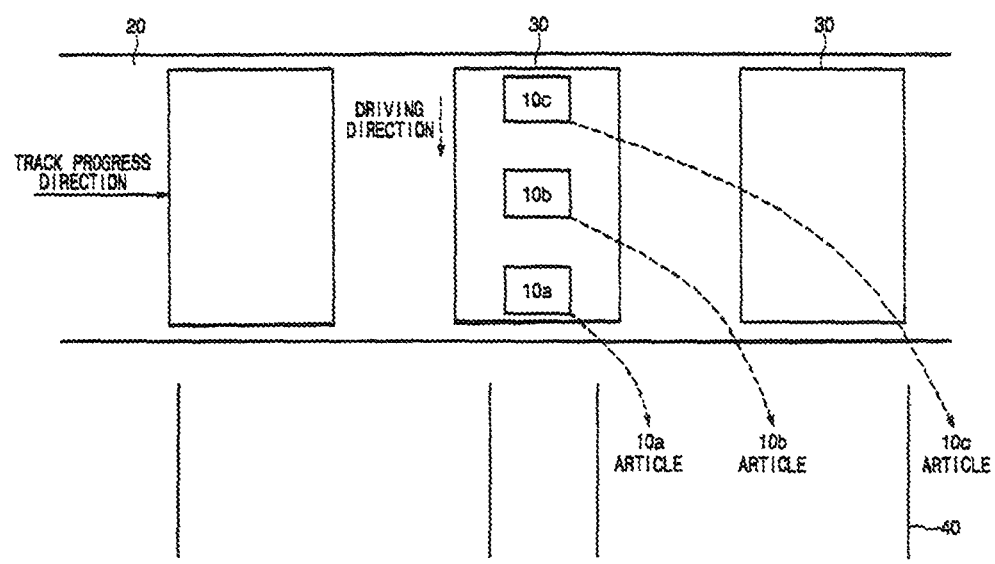
FIG. 1 is an exemplary diagram of wrong parcel sorting in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, for detailed description so as for those skilled in the art to easily carry out the technical spirit of the present invention, exemplary embodiments of the present invention will be described with reference to the accompanying drawings.

The present invention relates to a technology that accurately and efficiently sorts a parcel loaded on a cart to a destination chute.

Figure 2:
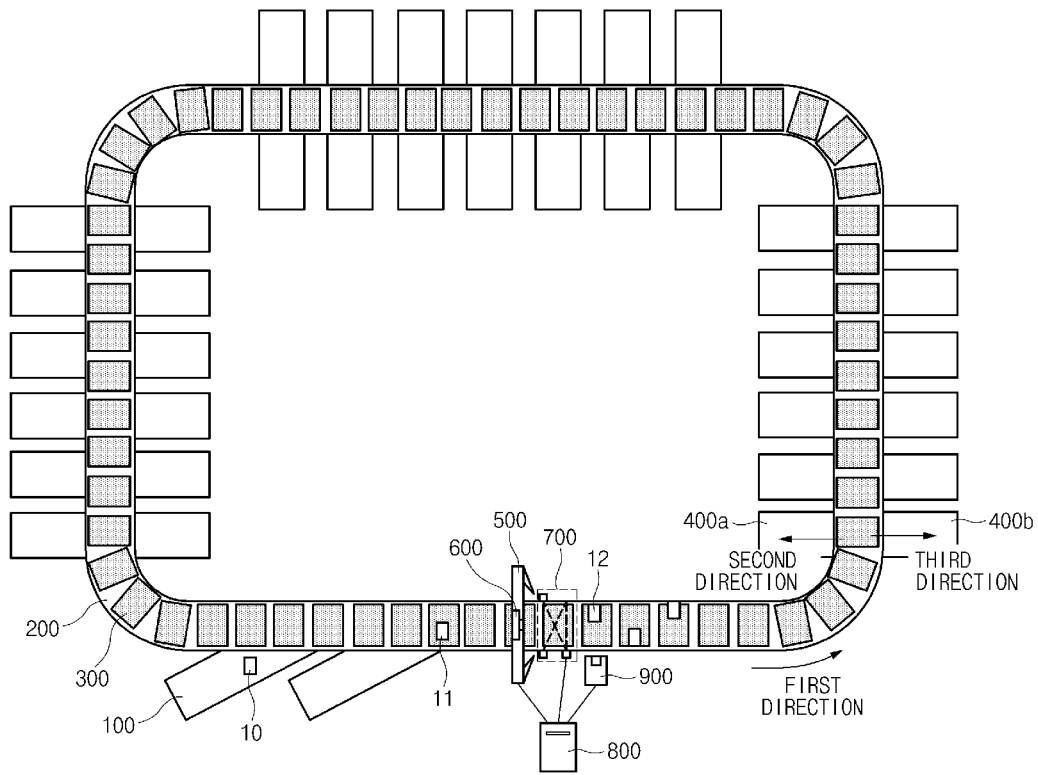
FIG. 2 is an overall configuration diagram of a system for sorting a parcel according to an exemplary embodiment of the present invention.
Figure 3:
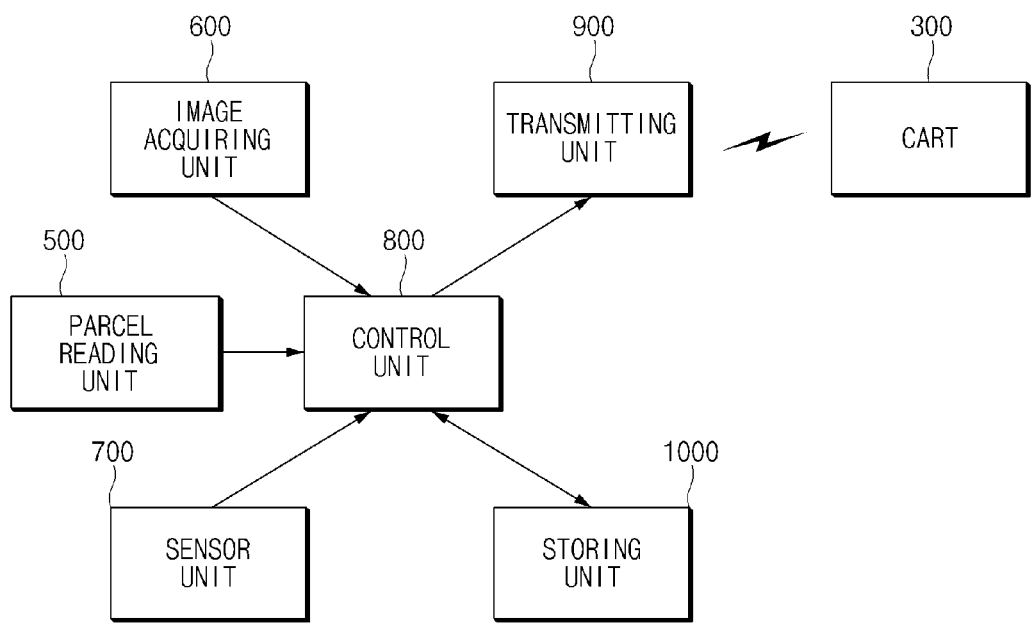
FIG. 3 is a detailed configuration diagram of the system for sorting a parcel according to the exemplary embodiment of the present invention.

Hereinafter, a system for sorting a parcel according to an exemplary embodiment of the present invention will be described with reference to FIGS. 2 to 9. FIG. 2 is an overall configuration diagram of a system for sorting a parcel according to an exemplary embodiment of the present invention. FIG. 3 is a detailed configuration diagram of the system for sorting a parcel.

Referring to FIGS. 2 and 3, the system for sorting a parcel according to the present invention includes an inlet unit 100 in which the parcel is put, a track 200 which moves in a first direction, a cart 300 which is provided on the track 200, chutes 400a and 400b provided in both directions of the track 200, to which the parcel is sorted for each destination, an automatic parcel reading unit (OHS) 500, an image acquiring unit 600, a sensor unit 700, a control unit 800, and a transmitting unit 900.

When the inlet unit 100 is configured by a conveyor belt and a parcel 10 is loaded on the conveyor belt, the conveyor belt moves to load the parcel 10 on the cart 300 on the track 200.

The chutes 400a and 400b are divided into a first chute 400a and a second chute 400b for each destination, and parcels with the same destination are dropped for each chute.

The automatic parcel reading unit 500 reads destination information of the parcel and transfers the read information to the control unit 800.

The image acquiring unit 600 as a camera photographs the parcel 10 on the cart 300.

The sensor unit 700 senses the position of an article to transfer a sensing result to the control unit 800.

The control unit 800 calculates the position of the parcel by using image information of the image acquiring unit 600 or sensor information of the sensor unit 700. That is, the control unit 800 calculates an interval between both sides of the cart 300 and the parcel from the image information by using an edge detection technique, to calculate the position of the parcel. Further, the control unit 800 checks a sensing time from the sensor information to calculate the position of the parcel. A detailed method of calculating the position of the parcel will be described in detail with reference to FIGS. 4 to 6 to be described below. Further, the control unit 800 receives the destination information from the parcel reading unit 500 to select the chutes 400a and 400b to which the parcel is to be discharged according to the destination information. That is, when the control unit 800 intends to discharge the parcel to the first chute 400a, the control unit 800 judges whether the parcel is positioned at an edge of the cart 300 in a second direction by using the image information or the sensor information, and when the parcel is spaced apart from the edge of the cart 300 in the second direction by a predetermined interval, the control unit 800 moves the parcel to the edge of the cart 300 in the second direction by controlling a cross belt of the cart 300. Meanwhile, when the control unit 800 intends to discharge the parcel to the second chute 400b, the control unit 800 judges whether the parcel is positioned at an edge of the cart 300 in a third direction by using the image information or the sensor information, and when the parcel is spaced apart from the edge of the cart 300 in the third direction by a predetermined interval, the control unit 800 moves the parcel to the edge of the cart 300 in the third direction by controlling the cross belt of the cart 300.

The transmitting unit 900 transmits a control signal for controlling movement of the cross belt of the cart to the cross belt of the cart 300 under the control by the control unit 800.

A storing unit 1000 stores destination information of the article, speed information of the track, and positional information of the article. In this case, the destination information of the article may be acquired by recognizing characters attached to the parcel by the image acquiring unit 600 or the destination information recognized through a scanner or a server separately configured in the inlet unit 100.

Hereinafter, the system for sorting a parcel, which includes a sensor, according to the exemplary embodiment of the present invention will be described below with reference to FIGS. 4 and 5.

Figure 4:
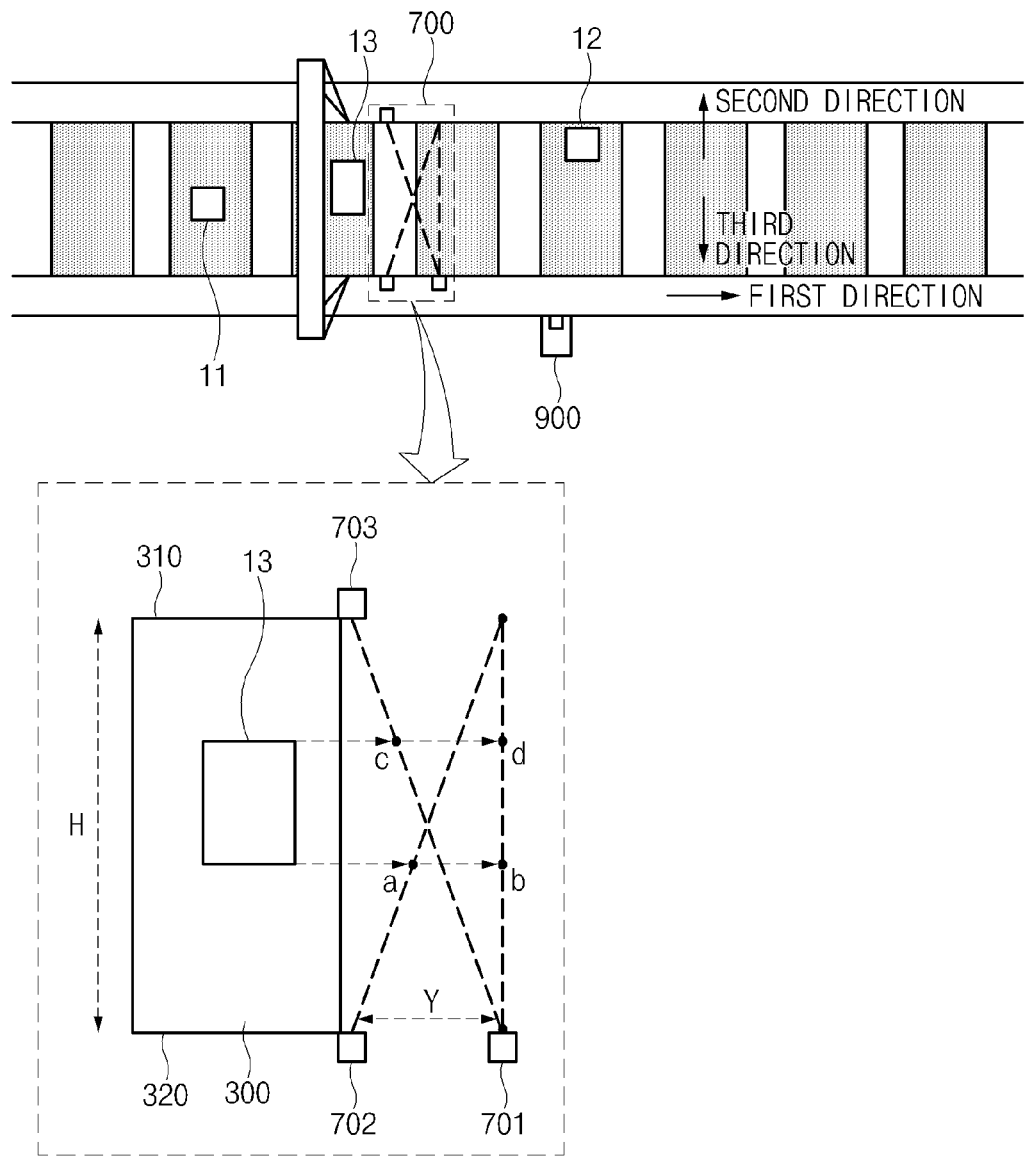
FIG. 4 is an enlarged diagram of the system for sorting a parcel, which includes a sensor, according to the exemplary embodiment of the present invention.

As illustrated in FIG. 4, the track 200 moves in the first direction and the cross belt of the cart 300 rotates in the second or third direction.

In this case, a long-axis length of the cart 300 has a length of "H", and a third sensor 703 that senses the parcel in a diagonal direction is provided at the end of the track 200 in the second direction, a second sensor 702 that senses the parcel in the diagonal direction is provided at the end of the track 200 in the third direction, and a first sensor 701 that linearly senses the parcel in a longitudinal direction of the cart 300 is provided to be spaced apart from the second sensor 702. In this case, the third sensor 703 performs diagonal sensing in a direction to face the first sensor 701 and the second sensor 702 performs diagonal sensing relative to a position opposite to the first sensor 701.

Figure 5A:
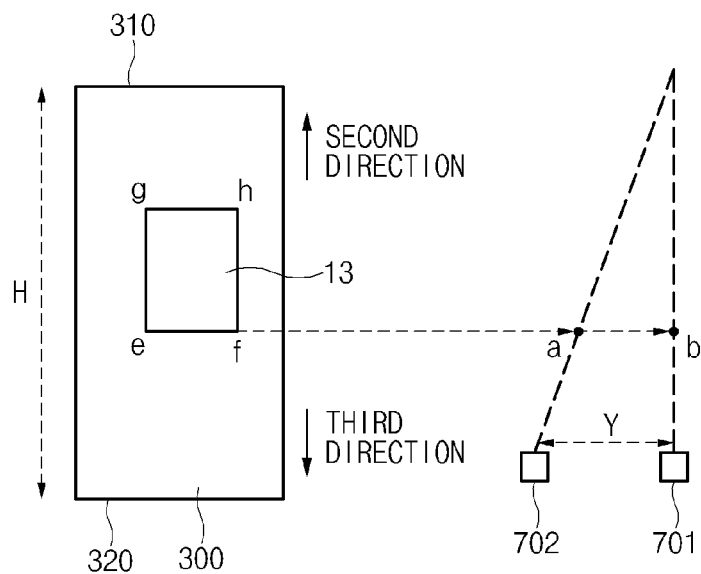
FIG. 5A is an exemplary diagram illustrating a sensing method in a case in which the parcel is classified to a first chute in FIG. 2.

In FIG. 2, a method for sensing the position of the parcel when classifying the parcel to the first chute 400a provided in the second direction will be described with reference to FIG. 5A.

When the parcel needs to be classified to the first chute 400a of FIG. 2, a parcel 13 needs to be positioned at a second-direction edge 310 of the cart 300. However, actually, when the parcel 13 is loaded on the cart 300, the parcel 13 may not be often positioned at the edge 310. Therefore, in the present invention, the position of the parcel 13 is sensed by using the first sensor 701 and the second sensor 702 as illustrated in FIG. 5A.

That is, the parcel 13 is first sensed at point a by the second sensor 702, and while the parcel 13 moves by the track in the first direction, the parcel 13 is sensed at point b by the first sensor 701. Therefore, a time from point a where the parcel is first sensed to point b is referred to as a first sensing time, and as the first sensing time is longer, a first side ef of the parcel 13 gets closer to a third-direction edge 320 of the cart 300. On the contrary, as the first sensing time is shorter, the first side ef of the parcel 13 gets closer to the second-direction edge 310 of the cart 300. In this case, since the parcel 13 needs to be classified to the first chute 400a, the parcel 13, which is positioned to get closer to the second-direction edge 310 of the cart 300, is easily classified to the first chute 400a. Accordingly, when the parcel 13 does not get closer to the second-direction edge 310 of the cart 310 according to the first sensing time sensed by the first sensor 701 and the second sensor 702, that is, when the parcel 13 is positioned at the center of the cart 300 or positioned to get closer to the third-direction edge 320, the parcel 13 is controlled to be positioned to get closer to the second-direction edge 310 of the cart 300 by rotating the cross belt of the cart 300 in the second direction.

In this case, an equation for calculating the position of the first side ef of the parcel 13 is represented in Equation 1 below.

$$x = H\,(m) \cdot N\,(s) \cdot U\,(m/s) / Y\,(m) \quad \text{[Equation 1]}$$

Herein, x represents the position of the first side ef of the parcel 13, H(m) represents a long-axis length of the cart 300, N(s) represents the first sensing time from point a to point b, U(m/s) represents a speed of the track 200, and Y(m) represents a distance between the first sensor 701 and the second sensor 702.

Figure 5B:
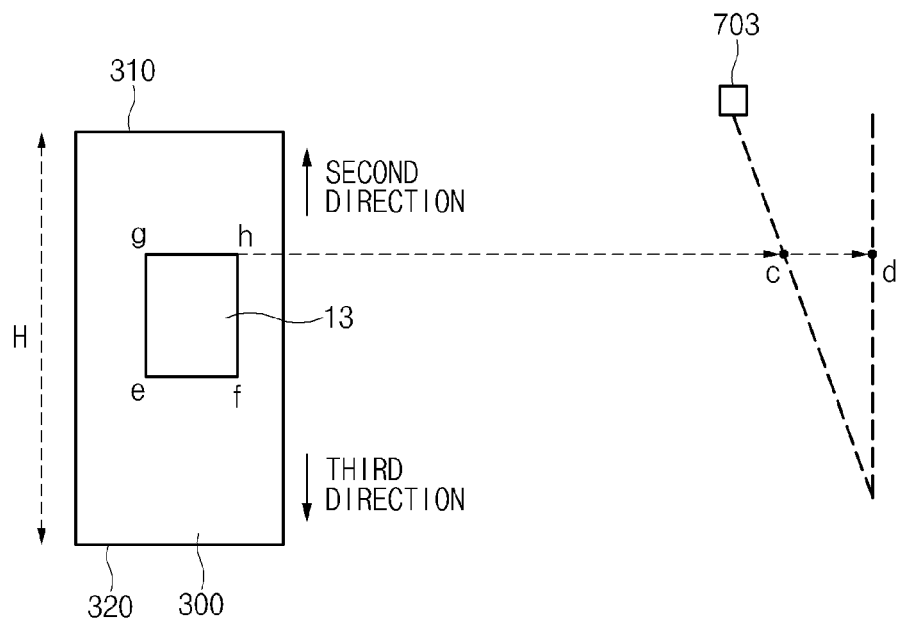
FIG. 5B is an exemplary diagram illustrating a sensing method in a case in which the parcel is classified to a second chute in FIG. 2.

Meanwhile, in FIG. 2, the method for sensing the position of the parcel when classifying the parcel to the second chute 400b provided in the third direction will be described with reference to FIG. 5B.

When the parcel needs to be classified to the second chute 400b of FIG. 2, the parcel 13 needs to be positioned at the third-direction edge 320 of the cart 300. However, actually, when the parcel 13 is loaded on the cart 300, the parcel 13 may not be often positioned at the edge 320. Therefore, the position of the parcel 13 is sensed by using the first sensor 701 and the third sensor 703 as illustrated in FIG. 5B.

That is, the parcel 13 is first sensed at point c by the third sensor 703, and while the parcel 13 moves by the track in the first direction, the parcel 13 is sensed at point d by the first sensor 701. Therefore, a time from point c where the parcel is first sensed to point d is referred to as a second sensing time, and as the second sensing time is longer, a second side gh of the parcel 13 gets close to the second-direction edge 310 of the cart 300. On the contrary, as the second sensing time is shorter, the second side gh of the parcel 13 gets close to the third-direction edge of the cart 300. In this case, since the parcel 13 needs to be classified to the second chute, the parcel 13, which is positioned to get closer to the third-direction edge of the cart 300, is easily classified to the second chute. Accordingly, when the parcel 13 does not get closer to the third-direction edge 320 of the cart 310 according to the sensing time sensed by the first sensor 701 and the third sensor 703, that is, when the parcel 13 is positioned at the center of the cart 300 or positioned to get closer to the second-direction edge 310, the parcel 13 is controlled to be positioned to get closer to the third-direction edge 320 of the cart 300 by rotating the cross belt of the cart 300 in the third direction.

As such, the position of the second side gh of the parcel 13 may be calculated by adopting Equation 1 above. However, parameter x represents the position of the second side gh of the parcel 13, H(m) represents the long-axis length of the cart 300, N(s) represents the second sensing time from point c to point d, U(m/s) represents the speed of the track 200, and Y(m) represents a distance between the first sensor 701 and the third sensor 703.

Figure 6:
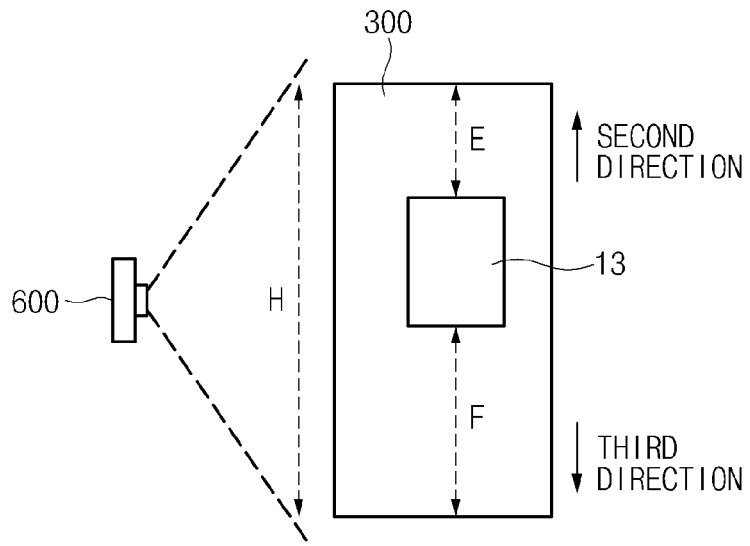
FIG. 6 is a diagram illustrating an example of sensing a position of an article by using a camera.

FIG. 6 is a diagram illustrating an example of sensing a position of an article by using a camera.

The parcel 13 loaded on the cart 300 is photographed by using a camera that is the image acquiring unit 600. Edges of the parcel 13 and the cart 300 are extracted from the information obtained from the photographed image through the edge extraction technique, and intervals E and F between the edges of the parcel 13 and the cart 300 are extracted. Therefore, the control unit 800 moves the cross belt of the cart 300 by using information on the intervals E and F between the edges of the parcel 13 and the cart 300, and moves the parcel 13. That is, when the parcel is intended to be classified to the first chute 400a in FIG. 2, the parcel 13 is moved in the second direction in FIG. 6, and when the parcel is intended to be classified to the second chute 400b of FIG. 2, the parcel 13 is moved in the third direction in FIG. 6.

Figure 7:
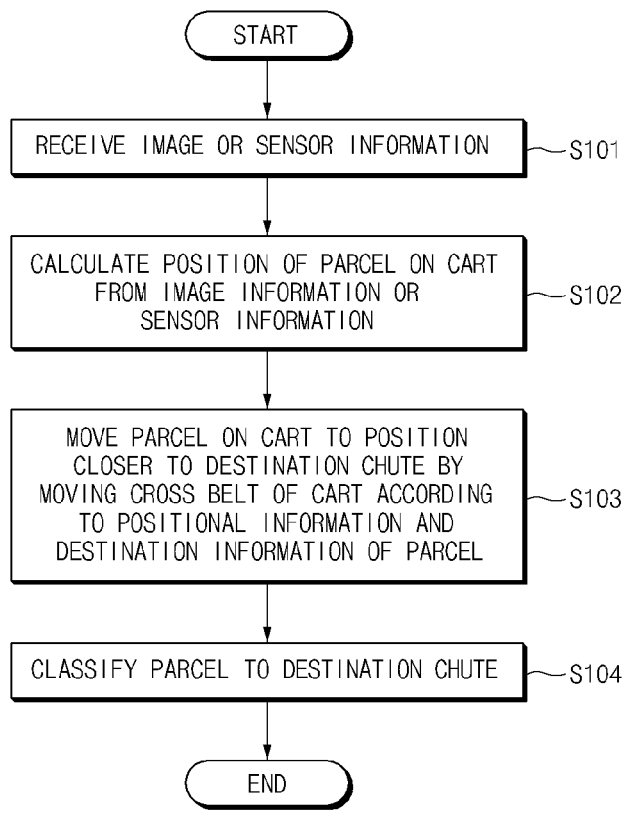
FIG. 7 is a flowchart illustrating a method for sorting a parcel according to an exemplary embodiment of the present invention.

Hereinafter, a method for sorting a parcel according to an exemplary embodiment of the present invention will be described in detail with reference to FIG. 7.

First, the control unit 800 receives the image information from the image acquiring unit 600 or receives the sensor information from the sensor unit 700 (S101).

Therefore, the control unit 800 calculates the position of the parcel on the cart by using the image information or the sensor information (S102).

Thereafter, the control unit 800 moves the parcel to an edge of the cart, which gets closer to a destination chute, by controlling movement of the cross belt of the cart according to the position of the parcel and destination information (S103). In this case, the destination information may be received from a server of the inlet unit to be stored in advance, or acquired through the image acquiring unit 600.

Therefore, the parcel on the cart 300 is classified to a corresponding destination chute (S104).

Figure 8:
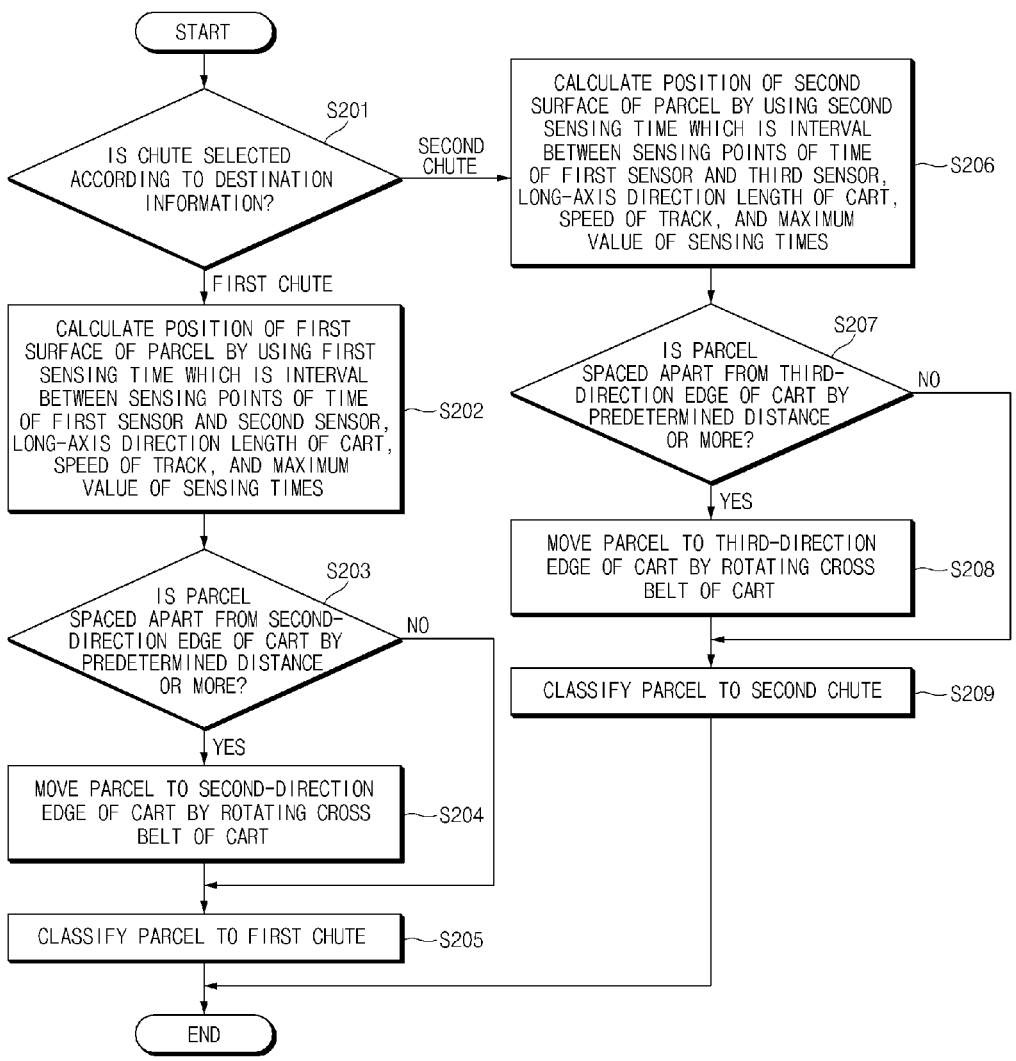
FIG. 8 is a flowchart illustrating a method for sensing a position of an article by using a sensor according to an exemplary embodiment of the present invention.

Hereinafter, a method for sorting a parcel by using a sensor according to an exemplary embodiment of the present invention will be described in detail with reference to FIG. 8.

First, the control unit 800 selects the chute according to the destination information (S201).

Therefore, when the first chute 400a is selected, the control unit 800 calculates a position of a first surface e, f of the parcel by using a first sensing time which is an interval between sensing points a and b of the first sensor 701 and the second sensor 702, a long-axis direction length H of the cart 300, a speed of the track 200, and using a maximum value Y of the sensing times (S202).

Subsequently, the control unit 800 judges whether the parcel is spaced apart from a second-direction edge of the cart 300 by a predetermined distance or more by using the calculated positional information (S203), and when the parcel is spaced apart by the predetermined distance or more, the control unit 800 moves the parcel to the second-direction edge 310 by moving the cross belt of the cart 300 in the second direction (S204).

Thereafter, the parcel is moved by the track 200 to be classified to the first chute 400a (S205).

Meanwhile, in process S101, when the second chute 400b is selected according to the destination information of the parcel, the control unit 800 calculates a position of a second surface g, h of the parcel by using a second sensing time which is an interval between sensing points a and c of the first sensor 701 and the third sensor 703, the long-axis direction length H of the cart 300, the speed of the track 200, and a maximum value Y of the sensing times (S206).

Subsequently, the control unit 800 judges whether the parcel is spaced apart from a third-direction edge of the cart 300 by a predetermined distance or more by using the calculated positional information (S207), and when the parcel is spaced apart by the predetermined distance or more, the control unit 800 moves the parcel to the third-direction edge 320 by moving the cross belt of the cart 300 in the third direction (S208).

Thereafter, the parcel is moved by the track 200 to be classified to the second chute 400b (S209).

Figure 9:
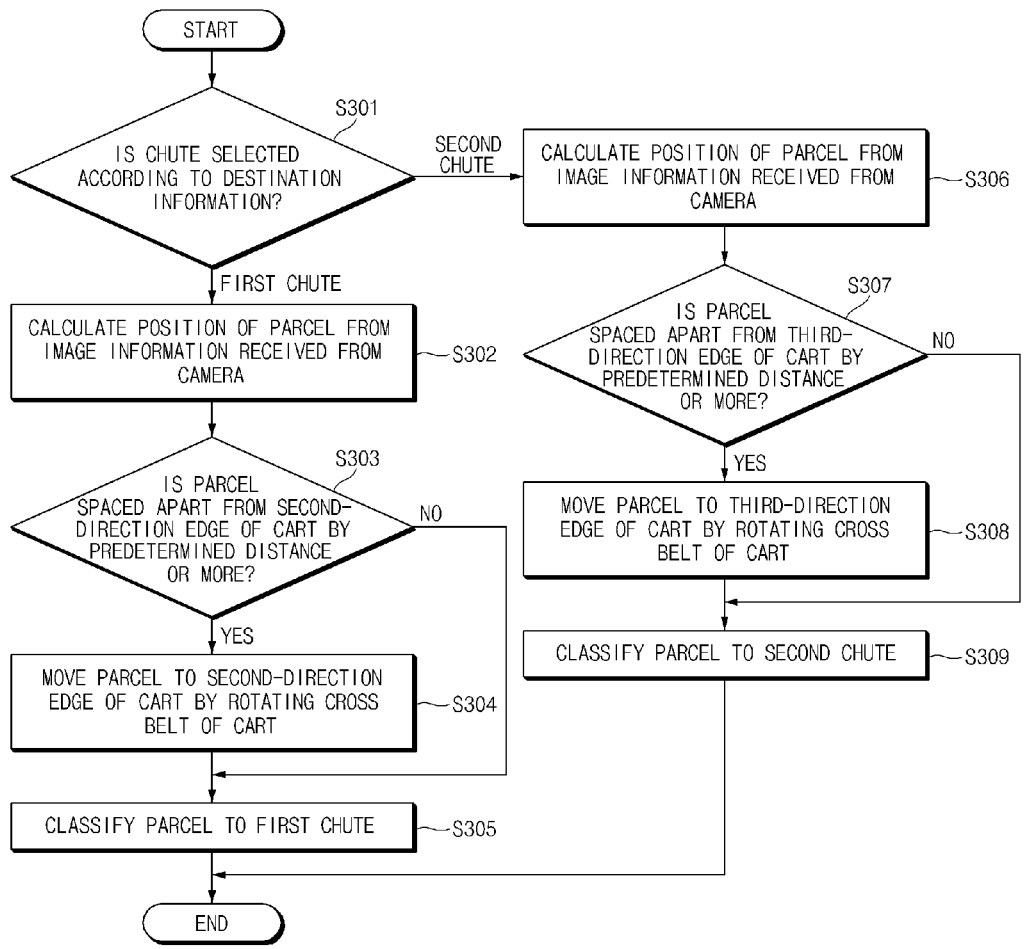
FIG. 9 is a flowchart illustrating a method for sensing a position of an article by using a camera according to an exemplary embodiment of the present invention.

Hereinafter, a method for sensing the position of an article by using a camera according to an exemplary embodiment of the present invention will be described in detail with reference to FIG. 9.

First, the control unit 800 selects the chute according to the destination information (S301).

Therefore, when the first chute 400a is selected according to the destination information, the control unit 800 calculates the position of the parcel by using image information calculated from the camera (S302).

Thereafter, the control unit 800 judges whether the parcel is spaced apart from the second-direction edge of the cart 300 by a predetermined distance or more by using the calculated positional information (S303), and when the parcel is spaced apart by the predetermined distance or more, the control unit 800 moves the parcel to the second-direction edge 310 by moving the cross belt of the cart 300 in the second direction (S304).

Thereafter, the parcel is moved by the track 200 to be classified to the first chute 400a (S305).

Meanwhile, in process S301, when the second chute 400b is selected according to the destination information of the parcel, the control unit 800 calculates the position of the parcel by using the image information received from the camera (S306).

Subsequently, the control unit 800 judges whether the parcel is spaced apart from a third-direction edge of the cart 300 by a predetermined distance or more by using the calculated positional information (S307), and when the parcel is spaced apart by the predetermined distance or more, the control unit 800 moves the parcel to the third-direction edge 320 by moving the cross belt of the cart 300 in the third direction (S308).

Thereafter, the parcel is moved by the track 200 to be classified to the second chute 400b (S309).

As described above, the present invention relates to the system for sorting a parcel, which automatically sorts the parcel, and the articles loaded on the cart is, are advance, positioned on the cart for each destination direction by using the image information and the sensor information, thereby reducing a missorting probability and the width of a sorting hole to increase spatial efficiency.

The exemplary embodiments of the present invention are illustrative only, and various modifications, changes, substitutions, and additions may be made without departing from the technical spirit and range of the appended claims by those skilled in the art, and it will be appreciated that the modifications and changes are included in the appended claims.

What is claimed is:

1. A system for sorting a parcel, which moves an article to a cart according to destination information of the article to classify the article to a chute for each destination, the system comprising:
    an article position detecting unit which detects positional information of the article loaded on the cart that moves in a first direction by a track which moves in the first direction; and
    a control unit which controls the cart to rotate in a second or third direction according to the detected positional information of the article and destination information of the article,
    wherein the article position detecting unit includes:
        a first sensor which linearly senses the article in the second or third direction of the cart;
        a second sensor which senses the article in a first diagonal direction of the cart; and
        a third sensor which is positioned to be opposite to the second sensor and senses the article in a second diagonal direction of the cart.

2. The system of claim 1, wherein the second sensor is provided at the end of the track in the second direction of the cart, the third sensor is provided at the end of the track in the third direction of the cart, and the first sensor is provided at a position spaced apart from the third sensor by a predetermined distance.

3. The system of claim 1, wherein when the article needs to be classified to the first chute provided in the second direction of the cart according to the destination information of the article, the control unit calculates the position of the article by using a first sensing time which is a time interval between a time when the article is sensed by the second sensor and a time when the article is sensed by the first sensor, a speed of the track, a maximum value of the sensing times, and a long-axis length value of the cart.

4. The system of claim 1, wherein when the article needs to be classified to the second chute provided in the third direction of the cart according to the destination information of the article, the control unit calculates the position of the article by using a second sensing time which is a time interval between a time when the article is sensed by the third sensor and the time when the article is sensed by the first sensor, the speed of the track, and a maximum value of the sensing times, and a length value of the cart.

5. A method for sorting a parcel, which loads an article on a cart according to destination information of the article to classify the article to a chute for each destination, the method comprising:
    calculating the position of the article loaded on the cart which moves in a first direction by a track; and
    moving the article on the cart to a second direction or a third direction that is an edge position which gets close to the chute for each destination on the cart, by moving a cross belt of the cart according to positional information of the article and destination information of the article,
    wherein the calculating of the position of the article includes:
        sensing the article by using a first sensor that senses the article in a straight-line direction to a long-axis direction of the cart, a second sensor that is provided at the end of the third direction of the cart and senses the article in a diagonal direction of the cart, and a third sensor that is provided at the end of the second direction of the cart and senses the article in the diagonal direction of the cart; and
        sensing the position of the article by using a sensing time which is an interval between a time when the article is sensed by the diagonal sensor and a time when the article is sensed by the straight-line sensor.

6. The method of claim 5, wherein in the sensing of the position of the article, when the article needs to be classified to a first chute provided in the second direction of the cart according to the destination information of the article, it is judged that the article is positioned at a position distant from the first chute on the cart in the case where the sensing time by the second sensor and the first sensor is long.

7. The method of claim 5, wherein in the sensing of the position of the article, when the article needs to be classified to a second chute provided in the third direction of the cart according to the destination information of the article, it is judged that the article is positioned at a position distant from the second chute on the cart in the case where the sensing time by the third sensor and the first sensor is long.

* * * * *